United States Patent Office 3,819,755
Patented June 25, 1974

3,819,755
O,O-DIALKYL-O-(4-TRIFLUOROMETHYLPHENYL)-THIONOPHOSPHORIC ACID ESTERS
Horst Tarnow, Leverkusen, Klaus Sasse, Schildgen, Bernhard Homeyer, Opladen, and Wolfgang Behrenz, Cologne, Germany, assignors to Bayer Aktiengesellschaft, Leverkusen, Germany
No Drawing. Filed Sept. 27, 1972, Ser. No. 292,579
Claims priority, application Germany, Oct. 2, 1971, P 21 49 312.9
Int. Cl. A01n 9/36; C07f 9/16
U.S. Cl. 260—955         8 Claims

ABSTRACT OF THE DISCLOSURE

O,O-dialkyl-O-(4 - trifluoromethylphenyl)-thionophosphoric acid esters of the formula

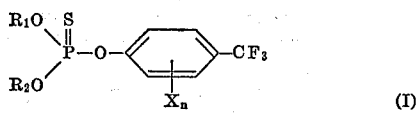

in which
$R_1$ and $R_2$ each independently is lower alkyl,
X is chlorine or bromine, and
n is an integer from 0 to 4, which possess nematocidal, insectidal, acaricidal, fungicidal and herbicidal properties.

---

The present invention relates to and has for its objects the provision of particular new O,O-dialkyl-O-(4-trifluoromethylphenyl)-thionophosphoric acid esters, optionally substituted on the phenyl ring with up to 4 chlorine and/or bromine atoms, which possess nematocidal, insectidal, acaricidal, fungicidal and herbicidal properties, active compositions in the form of mixtures of such compounds with solid and liquid dispersible carrier vehicles, and methods for producing such compounds and for using such compounds in a new way especially for combating pests, e.g. nematodes, insects, acarids, fungi and unwanted vegetation, with other and further objects becoming apparent from a study of the within specification and accompanying examples.

It is known from U.S. Patent Specification 2,761,806 that O,O-diethyl-O-(2,4-dichlorophenyl)-thionophosphoric acid ester (Compound A) can be used as a nematocidal and soil-insecticidal agent.

The present invention provides thiophosphoric acid esters of the formula

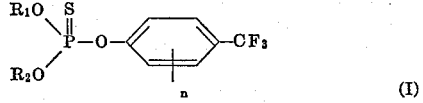

in which
$R_1$ and $R_2$ each independently is lower alkyl,
X is chlorine or bromine, and
n is an integer from 0 to 4.

The invention also provides a process for the production of a thiophosphoric acid ester of the formula (I) in which an O,O-dialkylthionophosphoric acid halide of the formula

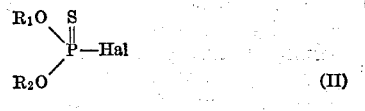

in which
Hal is chlorine or bromine, and
$R_1$ and $R_2$ have the meanings stated above, is reacted with a trifluoromethylphenol of the formula

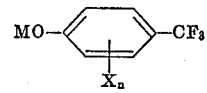

in which
M is hydrogen or a cation, and
X and n have the meanings stated above, in the presence (if M is hydrogen) of an acid-binder and optionally in the presence of a diluent.

$R_1$ and $R_2$ are preferably alkyl of 1 to 4 carbon atoms.
If M is a cation it is preferably an alkali metal.
The integer n is preferably 0, 1 or 2.

Surprisingly, the new thiophosphoric acid esters show a noteworthy nematocidal and soil-insecticidal activity which goes far beyond that of the known O,O-diethyl-O-(2,4-dichlorophenyl)-thionophosphoric acid ester which is the chemically closest active compound of the same type of activity.

The products according to the invention therefore represent a genuine enrichment of the art.

If O,O-diethylthionophosphoric acid chloride and 2-chloro-4-trifluoromethylphenol are used as starting materials, the reaction course can be represented by the following formula scheme:

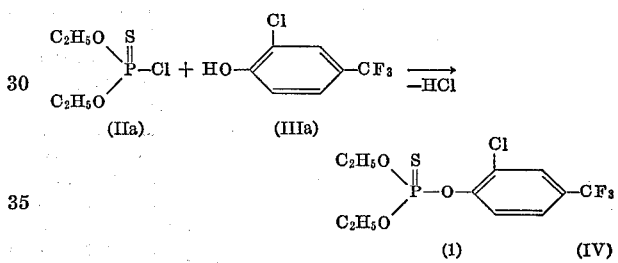

The O,O-dialkylthionophosphoric acid halide starting materials defined by the formula (II) are generally known. Examples include: O,O-dimethyl-, O-methyl-O-ethyl-, O-methyl-O-isopropyl-, O-methyl-O-(n-, iso-, sec.- or tert.-)-butyl-, O-ethyl-O-(n- or iso-)-propyl-, O-diethyl-, O-ethyl-O-(n-, iso-, sec.- or tert.-)-butyl-, O-di-n-propyl- and O-di-n-butyl-thionophosphoric acid chloride and bromide.

The trifluoromethylphenol starting materials defined by the formula (III) are disclosed in J. Am. Chem. Soc. 69, 2346–2350 (1947) and German Published Specification DAS 1,257,784). Examples include 3-chloro-, 3,5-dichloro-, 2,3,5-trichloro-, 2,6-dichloro-, 2-chloro-6-bromo-, 2-bromo-, 2,6-dibromo- and 2,3,6-tribromo-4-trifluoromethyl-phenol, and their alkali metal salts.

As diluent, all inert organic solvents are suitable. Preferred diluents include hydrocarbons, such as benzine, benzene and xylene; chlorinated hydrocarbons, such as methylene chloride and chlorobenzene; ethers, such as diethyl ether and dioxane; ketones, such as acetone and methylethyl ketone; and nitriles, such as acetonitrile and propionitrile. The reaction can also be carried out in water.

As acid-binder, all customary acid-binding agents may be used. Preferred agents include alkali metal hydroxides and alkaline earth metal hydroxides and alkali metal carbonates; metal alcoholates, such as sodium methylate; and tertiary amines, such as triethylamine or pyridine.

The reaction temperatures can be varied within a fairly wide range. In general, the reaction is carried out at about 0 to 100° C., preferably about 10 to 70° C.

The reaction normally proceeds with sufficient speed under normal pressure, but it can be carried out in closed vessels at superatmospheric pressure.

When carrying out the process, there are preferably used about 1 to 1.1 moles of dialkylthionophosphoric acid halide for each mole of trifluoromethylphenol.

The acid binder can be used in equimolar amount; preferably, however, an excess of approximately up to 10% is used.

The reaction mixture may be worked up in customary manner, for example by adding water and separating the phases. The crude products can be purified by distillation.

As already mentioned, the compounds according to the invention are distinguished by an outstanding, rapidly-commencing nematocidal activity and additionally possess a good soil-insecticidal activity. They are only slightly toxic to warm-blooded animals.

By reason of these properties, the new substances can be used in crop protection for the control of nematodes, especially those of phytopathogenic nature, and destructive soil insects. As a result of the broad activity spectrum of the compounds, the need for a separate control of the various types of pest often occurring together is dispensed with, a fact which represents a further advance in the art.

To the phytopathogenic nematodes there belong, in the main, bud and leaf nematodes (*Aphelenchoides*), such as the chrysanthemum foliar nematode (*A. ritzemabosi*), spring crimp nematode (*A. fragariae*) and rice white-tip nematode (*A. oryzae*); stem nematodes (*Ditylenchus*), such as the stem and bulb nematode (*D. dipsaci*); root-knot nematodes (*Meloidogyne*), such as *M. arenaria* and *M. incognita*; cyst nematodes (*Heterodera*), such as the golden nematode of potato (*H. rostochiensis*) and the sugar beet nematode (*H. schachtii*); and dagger nematodes such as those of the genera *Pratylenchus, Paratylenchus, Rotylenchus, Xiphinema* and *Radopholus*.

To the soil insects there belong, for example, wireworms (*Agriotes spec.*), cabbage root fly maggots (*Phorbia brassicae*) and larvae of the cockchafer (*Melolontha melolontha*); further, termites, such as the eastern subterranean termite (*Reticulitermes flavipes*).

The active compounds according to the invention also possess generally insecticidal and acaricidal activity. They can furthermore be used for the control of hygiene pests and pests of stored products. In addition, the active compounds also show fungitoxic as well as herbicidal activity.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.) amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolines, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other nematocides, insecticides, acaricides, or fungicides and herbicides, or bactericides, rodenticides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between 0.00001–20%, preferably 0.01–5%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle asistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

When used against nematodes, the preparations may be scattered uniformly on agricultural land in applied amounts of 1 to 100 kg. of active compound per hectare, and may subsequently be worked into the soil. When used against soil insects, the applied amounts are, in general, from 0.5 to 50 kg. of active compound per hectare, preferably 0.5 to 10 kg. per hectare.

Furthermore, the present invention contemplates methods of selectively killing, combating or controlling pests, e.g. nematodes, insects, acarids, fungi and unwanted vegetation, and more particularly methods of combating at least one of nematodes and soil-insects, which comprises applying to at least one of correspondingly (a) such nematodes, (b) such insects, (c) such acarids, (d) such fungi, (e) such unwanted vegetation, and (f) the corresponding habitat thereof, i.e. the locus to be protected, a correspondingly combative or toxic amount, i.e. a nematocidally, insecticidally, acaricidally, fungicidally or herbicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Critical concentration test:

Test nematode: *Meloidogyne sp.*
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration.

The preparation of active compound is intimately mixed with soil which is heavily infested with the test nematodes. The concentration of the active compound in the preparation is of practically no importance; only the amount of active compound per unit volume of soil, which is given in p.p.m., is decisive. The soil is filled into pots, lettuce is sown and the pots are kept at a greenhouse temperature of 27° C. After 4 weeks, the lettuce roots are examined for infestation with nematodes, and the degree of effectiveness of the active compound is determined as a percentage. The degree of effectiveness is 100% when infestation is completely avoided; it is 0% when the infestation is exactly the same as in the case of the control plants in untreated soil which has been infested in the same manner.

The active compounds, the amounts applied and the results can be seen from the following Table 1.

TABLE 1

Nematocides: Meloidogyne spec.

| Active compound (constitution) | | Concentration of active compound in p.p.m. | | | | |
|---|---|---|---|---|---|---|
| | | 40 | 20 | 10 | 5 | 2.5 |
| | | Degree of destruction in percent | | | | |
| 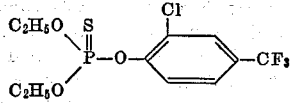 | (1) | 100 | 100 | 100 | 98 | 50 |
| 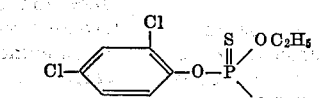 (known) | (A) | 100 | 100 | 80 | 70 | ------ |

EXAMPLE 2

Critical concentration test/soil insects:

Test insect: cabbage root fly maggots (*Phorbia brassicae*)
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg./l.), is decisive. The soil is filled into pots and the pots are left to stand at room temperature. After 24 hours, the test insects are put into the treated soil and, after a further 48 hours, the degree of effectiveness of the active compound is determined as a percentage by counting the dead and living test insects. The degree of effectiveness is 100% when all the test insects have been killed; it is 0% when exactly as many test insects are still alive as in the case of the control.

The active compounds, the amounts applied and the results can be seen from the following Table 2.

TABLE 2

Soil insecticides: *Phorbia brassicae* maggots in the soil

| Active compound (constitution) | | Concentration of active compound in p.p.m. | | | | | |
|---|---|---|---|---|---|---|---|
| | | 40 | 20 | 10 | 5 | 2.5 | 1.25 |
| | | Degree of destruction in percent | | | | | |
| 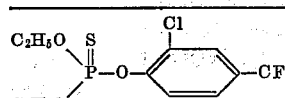 | (1) | 100 | 100 | 100 | 100 | 98 | 95 |
| 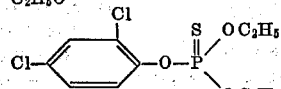 (known) | (A) | 100 | 100 | 80 | 70 | 0 | ------ |

EXAMPLE 3

Critical concentration test/soil insects:

Test insect: *Agrotis segetum*
Solvent: 3 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is diluted with water to the desired concentration. The preparation of active compound is intimately mixed with soil. The concentration of the active compound in the preparation is of practically no importance; only the amount of active compound per unit volume of soil, which is given in p.p.m. (for example mg./l.), is decisive. The soil is filled into pots and the pots are left to stand at room temperature. After 24 hours, the test insects are put into the treated soil and, after a further 48 hours, the degree of effectiveness of the active compound is determined as a percentage by counting the dead and living test insects. The degree of effectiveness is 100% when all the test insects have been killed; it is 0% when exactly as many test insects are still alive as in the case of the control.

The active compounds, the amounts applied and the results can be seen from the following Table 3.

The test insects, the active compounds, the concentrations of the reactive compounds and the periods of time at which there is a 100% knock down effect can be seen from Table 4.

TABLE 4
LT$_{100}$ test for Diptera (*Musca domestica*)

| Active compounds | | Concentration of active compound in the solution in percent | LT$_{100}$ |
|---|---|---|---|
| 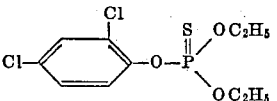 (known) | (A) | 0.2<br>0.04 | 150'<br>6'' |
| 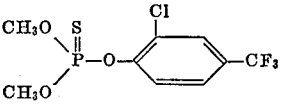 | (5) | 0.2<br>0.04<br>0.008<br>0.0016 | 45'<br>105'<br>120'<br>6''=90% |

EXAMPLE 5

LT$_{100}$ test for Diptera:

Test insects: *Aedes aegypti*
Solvent: acetone

TABLE 3
Soil insecticides: *Agrotis segetum*

| Active compound (constitution) | | Concentration of active compound in p.p.m. | | | | |
|---|---|---|---|---|---|---|
| | | 40 | 20 | 10 | 5 | 2.5 |
| | | Degree of destruction in percent | | | | |
| 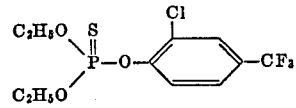 | (1) | 100 | 100 | 100 | 90 | 50 |
| 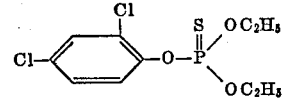 (known) | (A) | 50 | 0 | | | |

EXAMPLE 4

LT$_{100}$ test for *Diptera*:

Test insects: *Musca domestica*
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square centimeter of filter paper varies with the concentration of the solution of active compound used. About 25 test insects are then placed in the Petri dish and it is covered with a glass lid.

The condition of the test insects is continuously observed. The time which is necessary for a 100% knock down effect is determined.

2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square centmieter of filter paper varies with the concentration of the solution of active compound used. About 25 test insects are then placed in the Petri dish and it is covered with a glass lid.

The condition of the test insects is continuously observed. The time which is necessary for a 100% knock down effect is determined.

The test insects, the active compounds, the concentrations of the active compounds and the periods of time at which there is a 100% knock down effect can be seen from Table 5.

TABLE 5

LT$_{100}$ test for Diptera (*Aedes aegypti*)

| Active compounds | | Concentration of active compound of the solution in percent | LT$_{100}$ |
|---|---|---|---|
| 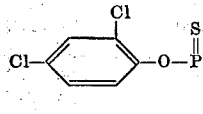 (known) | (A) | 0.2 | 6'' |
| 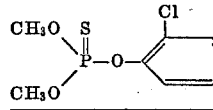 | (5) | 0.2<br>0.04<br>0.008 | 100'<br>6''<br>6''=40% |

EXAMPLE 6

Test insects: *Sitophilus granarius*
Solvent: acetone 2 parts by weight of active compound are dissolved in 1000 parts by volume of solvent. The solution so obtained is diluted with further solvent to the desired lower concentrations.

2.5 ml. of the solution of active compound are pipetted into a Petri dish. On the bottom of the Petri dish there is a filter paper with a diameter of about 9.5 cm. The Petri dish remains uncovered until the solvent has completely evaporated. The amount of active compound per square of filter paper varies with the concentration of the solution of active compound used. About 25 test insects are then placed in the Petri dish and it is covered with a glass lid.

The test insects, the active compounds, the concentrations of the active compounds and the knock down effect can be seen from the following Table 6.

TABLE 6

LD$_{100}$ test—*Sitophilus granarius*

| Active compounds | | Concentrations of active compounds, percent solution | Destruction in percent |
|---|---|---|---|
| 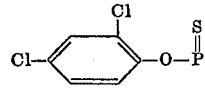 (known) | (A) | 0.2<br>0.04 | 95<br>3 |
| 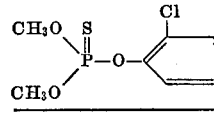 | (5) | 0.2<br>0.04<br>0.008 | 100<br>100<br>80 |

EXAMPLE 7

Mosquito larvae test:

Test insects: *Aedes aegypti* larvae
Solvent: 99 parts by weight acetone
Emulsifier: 1 part by weight benzylhydroxydiphenyl polyglycol ether To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100% means that all the larvae are killed .0% means that no larvae at all are killed.

The active compounds, the concentrations of the active compounds, the test insects and the results can be seen from Table 7.

TABLE 7

Mosquito larvae test

| Active compound | | Concentration of active compound of the solution in p.p.m. | Degree of destruction in percent |
|---|---|---|---|
| 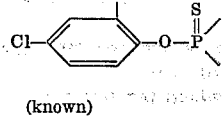 (known) | (A) | 10 | 90 |
| 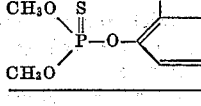 | (5) | 10<br>1 | 100<br>100 |

EXAMPLE 8

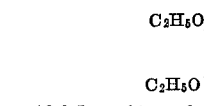

(1)

196.5 g. (1 mole) of 2-chloro-4-trifluoromethylphenol are dissolved in 1000 ml. of benzene. Thereafter, there are added dropwise, with ice cooling, first 198 g. (1.05 moles) of O,O-diethylthionophosphoric acid chloride and then 106 g. (1.05 moles) of triethylamine. Stirring is subsequently effected for 5 hours at 50° C., the reaction mixture is poured into 1000 ml. of ice water, the phases are separated and the benzene solution is dried over sodium sulfate. In the ensuing distillation there are obtained, after evaporation of the solvent, 286 g. (82% of theory) of O,O - diethyl - O - (2 - chloro - 4 - trifluoromethylphenyl) - thionophosphoric acid ester of boiling point 98° C./0.1 mm. and with refractive index $n_D^{20}$: 1.4847.

*Analysis*: Calc.: P, 8.9%; S, 9.2%. Found: P, 8.9%; S, 9.0%.

EXAMPLE 9

$$\begin{array}{c} C_2H_5O \\ \phantom{C_2H_5O} \diagdown \underset{\parallel}{\overset{S}{P}}-O-\!\!\left\langle\phantom{x}\right\rangle\!\!-CF_3 \\ C_2H_5O \phantom{\diagup} \end{array}$$

(2)

Analogously to Example 8, there is obtained, with the use of 4-trifluoromethylphenol, the O,O-diethyl-O-(4-trifluoromethylphenyl)-thionophosphoric acid ester in a yield of 86% of theory as a pale oil. $n_D^{20}$: 1.4810.

*Analysis*: Calc.: P, 9.9%; S, 10.2%. Found: P, 9.5%; S, 10.3%.

EXAMPLE 10

$$\begin{array}{c} C_2H_5O \\ \phantom{C_2H_5O} \diagdown \underset{\parallel}{\overset{S}{P}}-O-\!\!\left\langle\!\!\overset{Cl}{\phantom{x}}\!\!\right\rangle\!\!-CF_3 \\ C_2H_5O \phantom{\diagup} \phantom{xxxx} Cl \end{array}$$

(3)

Analogously to Example 8, there is obtained, with the use of 2,6-dichloro-4-trifluoromethyl-phenol, the O,O-diethyl - O - (2,6 - dichloro - 4 - trifluoromethyl - phenyl) - thionophosphoric acid ester in a yield of 78% of theory as a pale oil. $n_D^{20}$: 1.4959.

*Analysis*: Calc.: P, 8.1%; S, 8.4%. Found: P, 8.7%; S, 8.6%.

EXAMPLE 11

$$\begin{array}{c} C_2H_5O \\ \phantom{C_2H_5O} \diagdown \underset{\parallel}{\overset{S}{P}}-O-\!\!\left\langle\!\!\overset{Br}{\phantom{x}}\!\!\right\rangle\!\!-CF_3 \\ C_2H_5O \phantom{\diagup} \phantom{xxxx} Br \end{array}$$

(4)

Analogously to Example 8, there is obtained, with the use of 2,6-dibromo-4-trifluoromethyl-phenol, the O,O-diethyl-O-(2,6-dibromo-4-trifluoromethyl-phenyl)-thionophosphoric acid ester in a yield of 89% of theory as a thick, pale oil which crystallizes after several days.

Analysis: Calc.: P, 6.6%; S, 6.8%. Found: P, 6.2%; S, 6.3%.

EXAMPLE 12

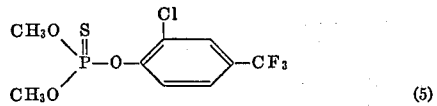

19.65 g. (0.1 mole) of 2-chloro-4-trifluoromethyl-phenol are dissolved in 100 ml. of acetonitrile. After the addition of 17 g. of finely powdered potassium carbonate, 16 g. (0.1 mole) of O,O-dimethyl-thionophosphoric acid chloride are slowly added dropwise. Stirring is subsequently effected for 4 hours at 60° C., the reaction mixture is poured into 300 ml. of ice water, and the separated oil is extracted with benzene. The benzene solution, after washing with water, is dried over sodium sulfate and concentrated in a vacuum. O,O-dimethyl-O-(2-chloro-4-trifluoromethyl-phenyl)-thionophosphoric acid ester remains behind as a yellowish oil in a yield of 25 g. (80% of theory). $n_D^{20}$: 1.4912.

Analysis: Calc.: Cl, 11.1%; P, 9.7%. Found Cl, 11.5%; P, 9.2%.

EXAMPLE 13

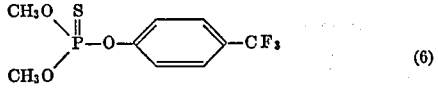

Analogously to Example 12, there is obtained, with the use of 4-trifluoromethyl-phenol, the O,O-dimethyl-O-(4-trifluoromethyl-phenyl)-thionophosphoric acid ester in a yield of 87% of theory as a yellowish oil. $n_D^{20}$: 1.4768.

Analysis: Calc.: P, 10.8%; S, 11.2%. Found: P, 9.8%; S, 10.2%.

It will be appreciated that the instant specification and examples are set forth by way of illustration and not limitation, and that various modifications and changes may be made without departing from the spirit and scope of the present invention.

What is claimed is:

1. A thionophosphoric acid ester of the formula

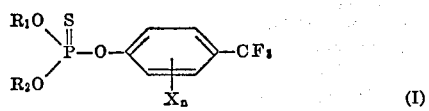

in which $R_1$ and $R_2$ each independently is lower alkyl,
X is chlorine or bromine, and
n is an integer from 0 to 4.

2. A compound according to claim 1 in which $R_1$ and $R_2$ each independently is alkyl of 1 to 4 carbon atoms, and n is 0, 1 or 2.

3. The compound according to claim 1 wherein such compound is O,O-diethyl-O-(2-chloro-4-trifluoromethylphenyl)-thionophosphoric acid ester of the formula

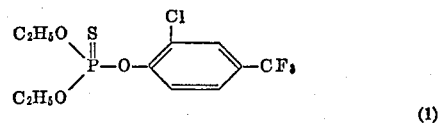

4. The compound according to claim 1 wherein such compound is O,O-diethyl-O-(4-trifluoromethylphenyl)-thionophosphoric acid ester of the formula

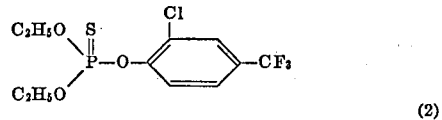

5. The compound according to claim 1 wherein such compound is O,O-diethyl-O-(2,6-dichloro-4-trifluoromethylphenyl)-thionophosphoric acid ester of the formula

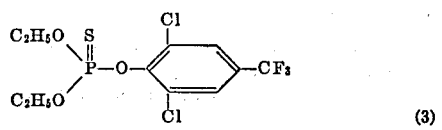

6. The compound according to claim 1 wherein such compound is O,O-diethyl-O-(2,6-dibromo-4-trifluoromethylphenyl)-thionophosphoric acid ester of the formula

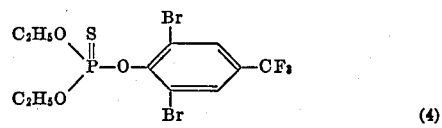

7. The compound according to claim 1 wherein such compound is O,O-dimethyl-O-(2-chloro-4-trifluoromethylphenyl)-thionophosphoric acid ester of the formula

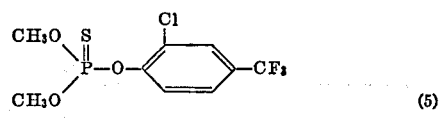

8. The compound according to claim 1 wherein such compound is O,O-dimethyl-O-(4-trifluoromethylphenyl)-thionophosphoric acid ester of the formula

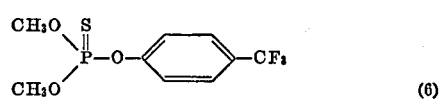

References Cited
UNITED STATES PATENTS
2,890,235   6/1959   Raley _____ 260—955

FOREIGN PATENTS
1,153,747   9/1963   Germany _____ 260—949

ANTON H. SUTTO, Primary Examiner

U.S. Cl. X.R.
424—225

(5/69)

UNITED STATES PATENT OFFICE
CERTIFICATE OF CORRECTION

Patent No. 3,819,755     Dated   June 25, 1974

Inventor(s)   HORST TARNOW ET AL.

It is certified that error appears in the above-identified patent and that said Letters Patent are hereby corrected as shown below:

Col. 12, line 5 of claim 4, cancel "Cl" in the formula.

Signed and sealed this 8th day of October 1974.

(SEAL)
Attest:

McCOY M. GIBSON JR.  
Attesting Officer

C. MARSHALL DANN  
Commissioner of Patents